United States Patent [19]

Cho et al.

[11] Patent Number: 5,544,294
[45] Date of Patent: Aug. 6, 1996

[54] METHOD FOR GENERATING A SUBPIXEL MASK FOR COMPUTER GRAPHICS SYSTEM AND APPARATUS THEREOF

[75] Inventors: Jun-hyoung Cho; Sang-gil Choi; Young-cheul Wee, all of Suwon, Rep. of Korea

[73] Assignee: Samsung Electronics Co., Ltd., Kyungki-do, Rep. of Korea

[21] Appl. No.: 310,321

[22] Filed: Sep. 22, 1994

[30] Foreign Application Priority Data

Dec. 28, 1993 [KR] Rep. of Korea ............... 93-30228

[51] Int. Cl.$^6$ .................................................. G06F 5/00
[52] U.S. Cl. .......................... 395/141; 395/126; 395/133
[58] Field of Search ........................... 395/141, 131, 395/126, 127, 128, 129–132, 133, 142; 382/254, 258, 266, 269, 274

[56] References Cited

U.S. PATENT DOCUMENTS 5,386,509  1/1995  Suzuki et al. .................. 395/131

*Primary Examiner*—Almis R. Jankus
*Attorney, Agent, or Firm*—Leydig, Voit & Mayer

[57] ABSTRACT

In a computer graphics system, a method for generating a subpixel mask for polygon edges directly by an operation without using a look-up table, includes the steps of forming subblocks by dividing a pixel into n subpixels depending on the slope of the polygon edge, calculating subblock coverage which is a distance from the pixel boundary to the intersection point of n subblocks and polygon edge, and generating an n×n subpixel mask depending on the calculated subblock coverage. In an apparatus using the method, edge-generated aliasing is removed.

16 Claims, 7 Drawing Sheets

METHOD FOR GENERATING A SUBPIXEL MASK FOR COMPUTER GRAPHICS SYSTEM AND APPARATUS THEREOF

BACKGROUND OF THE INVENTION

The present invention relates to a method for generating a subpixel mask for removing an aliasing phenomenon generated when a polygon edge is displayed as a pixel in a computer graphics system, and an apparatus thereof, and more particularly, to a method for generating a subpixel mask for polygon edges directly by an operation without using a look-up table, and an apparatus thereof.

Aliasing is an undesired phenomenon produced in the process of converting various analogical phenomena of nature into discrete values. This applies to a computer graphics system so that polygon edges are displayed so as to have a jagged or staircase appearance, due to the limited number of pixels on the screen of a cathode ray tube. Removing such an aliasing phenomenon is called anti-aliasing, which is implemented by point sampling (or multiple sampling) and area sampling in a computer graphics system. Point sampling is widely used since the hardware implementation thereof is relatively easy. However, when processing polygons which form thin lines or narrowly acute angles, point sampling causes the polygon to appear as a dashed line and entails such problems as a "net effect" phenomenon (see "Computer Graphics: Principle and Practice" by J. Foley and A. van Dam, pp617–623), which occur when the display of a small object moves. On the other hand, a better image quality can be obtained by area sampling in which the contribution of pixels is determined by an exact coverage calculation, but the hardware implementation of such a coverage calculation and the generation of the coverage shape present difficulties.

Meanwhile, an anti-aliasing method using subpixel mask solves the above problems caused by the pointing sampling, by adopting the area concept of area sampling to the conventional point sampling method, which easily achieves the coverage calculation and coverage shape generation. In other words, by displaying the pixel coverage occupied by an arbitrary object within a pixel and displaying the pixel coverage shape as a subpixel mask, since the set mask corresponds to the coverage for the arbitrary object and the coverage shape is stored as a mask, the information for performing the anti-aliasing more efficiently is supplied in case plural objects exist within a pixel.

Typical methods that make use of subpixel mask include an A-buffer algorithm (see "The A-buffer: an Anti-alisased Hidden Surface Method," by Loren Carpenter, *Siggraph*, 1984, pp103–108). However, according to this method, a subpixel mask (pixel bit mask) is generated in a software process, which entails slow speed. Another method using a subpixel mask is a method using a look-up table (see "A New Simple and Efficient Antialiasing with Subpixel mask," by Andreas Schilling, *Siggraph*, 1991, pp133–141). In the look-up table method, all possible subpixel mask shapes, which can be generated depending on the slope ($de_x$) of a triangle's edge and the distance (e) from pixel center to its edge, are prestored in a look-up table. Here, the a subpixel-mask is generated by indexing the look-up table with the above two pieces of information which are calculated when performing a triangle traversal operation, by a method proposed by Juan Pineda (see "A Parallel Algorithm for Polygon Rasterizations," *Siggraph*, 1988, pp17–20).

FIG. 1 illustrates the traversal of a triangle by the Pineda method. In a triangle formed by three vertices V1, V2 and V3, a pixel moves downward in the Y-axis direction one by one from vertex V2, where scanning is performed left and right, taking the location of the pixel as a base point BP. That is to say, if coordinates (X, Y, Z) of the starting point (vertex V2), RGB color components and the increments of R, G, B and Z values with respect to the X and Y coordinates, are input, the scanning of a pixel moves downward along axis Y by one pixel from the top vertex V2. Here, the data value of each advancing pixel is calculated to perform a leftward scanning with respect to base point BP. Then, when scanning reaches the edge, the scanning of pixels returns to base point BP and then a similar scanning to the right is performed. When scanning reaches the triangle's other edge, the scanning returns to the base point again to then be incremented by one pixel along the Y axis, whereupon left and right scanning is repeated and moves downward along the Y axis. In the Pineda method, by calculating the distance from pixel center C to the edge, it is determined whether the edge is reached. That is to say, if the calculated value is positive, it is determined that the scanned pixel lies inside the triangle, and if negative, it is determined that the pixel is beyond the edge and scanning returns to the base point BP.

FIG. 2 is a diagram showing a pixel divided into 4×4 subpixels, that is, sixteen subpixels (from 0 to 15). Here, each pixel is switched on or off depending on the pixel coverage, which thereby generates a set of subpixel mask.

FIGS. 3A, 3B and 3C illustrate the concept of the conventional subpixel mask generator using the look-up table as proposed by Schilling, by adopting the method of FIG. 1. Here, FIG. 3A shows the slope $de_x$ of an edge as it moves across a pixel having a center C, wherein the edge is at a distance e from the pixel's center. Then, in FIG. 3B, the information of FIG. 3A is input to a look-up table and 16-bit data is output for generating a subpixel mask, which results in FIG. 3C showing one 4×4 subpixel mask corresponding to the edge position of FIG. 3A.

According to the conventional method for generating a subpixel mask using the look-up table, 4×4 subpixel mask generation requires total eleven bits for expressing parameters, with five bits for the polygon edge parameter e which is the distance from the pixel center to the polygon edge, four bits assigned for the parameter $de_x$ (the e variation with respect to $\Delta X$) and two sign bits: one $de_x$ sign bit and one bit for the sign of $de_y$ (the e variation with respect to $\Delta Y$). Therefore, a $2^{11} \times 16$-bit memory is necessary for constituting the polygon edge by a look-up table, and the look-up table for generating an 8×8 subpixel mask requires fifteen bits to express the necessary parameters, which means that the memory capacity must be $2^{15} \times 64$ bits. Furthermore, in practice, as three edges form a basic triangular polygon, $2^{11} \times 16 \times 3$-bit memories are necessary for implementing by the look-up table method. Hence, with such large memories being necessary, the fabrication of application-specific intergrated circuit (ASIC) for the hardware implementation of a graphics algorithm is quite cumbersome.

SUMMARY OF THE INVENTION

Therefore, in order to solve the above problem of the prior art, it is an object of the present invention to provide a method for generating a polygon-edge subpixel mask directly by operation, without using a look-up table memory.

It is another object of the present invention to provide an apparatus for generating a polygon-edge subpixel mask directly by operation, without using a look-up table memory.

To accomplish the above first object of the present invention, there is provided a method wherein an n×n subpixel mask of a pixel is generated by receiving ΔX and ΔY values of an edge having a predetermined slope and the initial value of a cross distance, the method comprising the steps of: forming subblocks by dividing a pixel into n subblocks depending on the slope; calculating subblock coverage by substracting the slope ratio value from the cross distance after calculating the corresponding cross distance from the initial value of the cross distance by an interpolation method and claculating slope ratio values of the formed subblocks; and generating an n×n subpixel mask depending on the calculated subblock coverage, whereby aliasing generated at the edge is removed.

To accomplish the other object of the present invention, there is provided an apparatus wherein an n×n subpixel mask of a pixel is generated by receiving ΔX and ΔY values of an edge having a predetermined slope and the initial value of a cross distance, the apparatus comprising: a slope ratio value calculator for calculating a slope ratio value by selecting the ΔX or ΔY value depending on the slope; a cross distance interpolator for calculating the cross distance necessary for computing subblock coverage using an interpolation method by receiving the initial value of the cross distance, and selecting the same for use in computing the subblock coverage; a subblock coverage calculator for calculating the subblock coverage by receiving the outputs of the slope ratio value calculator and the cross distance interpolator; data converting means for receiving the output of the subblock coverage calculator and converting the received data into data for setting a subpixel mask; and a subpixel mask generator for generating an n×n subpixel mask depending on the slope and the output of the cross distance interpolator, by receiving the output of the data converter, whereby aliasing generated at the edge is removed.

Also, in an apparatus according to the present invention wherein aliasing generated at triangle edges is removed, the apparatus comprises: a first edge processor for generating an n×n subpixel mask for a pixel passing over a first edge by receiving ΔX1 and ΔY1 values of the first edge and the initial value of a cross distance; a second edge processor for generating an n×n subpixel mask for a pixel passing over a second edge by receiving ΔX2 and ΔY2 values of the second edge and the initial value of the cross distance; a third edge processor for generating an n×n subpixel mask for a pixel crossing over a third edge by receiving ΔX3 and ΔY3 values of the third edge and the initial value of the cross distance; and an AND gate for performing an AND operation by receiving the outputs of the first, second and third edge processors.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The embodiment of the present invention shows that the aliasing generated at a polygon edge can be removed when rasterization is processed, using triangle primitives (polygon) for more convenience and better understanding of explanation. In other words, it is indicated that the coverage of a subblock by obtaining the edge of slope moving over pixels is calculated and thereby aliasing is removed by generating a 4×4 subpixel mask. Of course, this concept of the present invention may also be adopted in an arbitrary polygon other than a triangle or in another operation method.

Figures 1, 2:
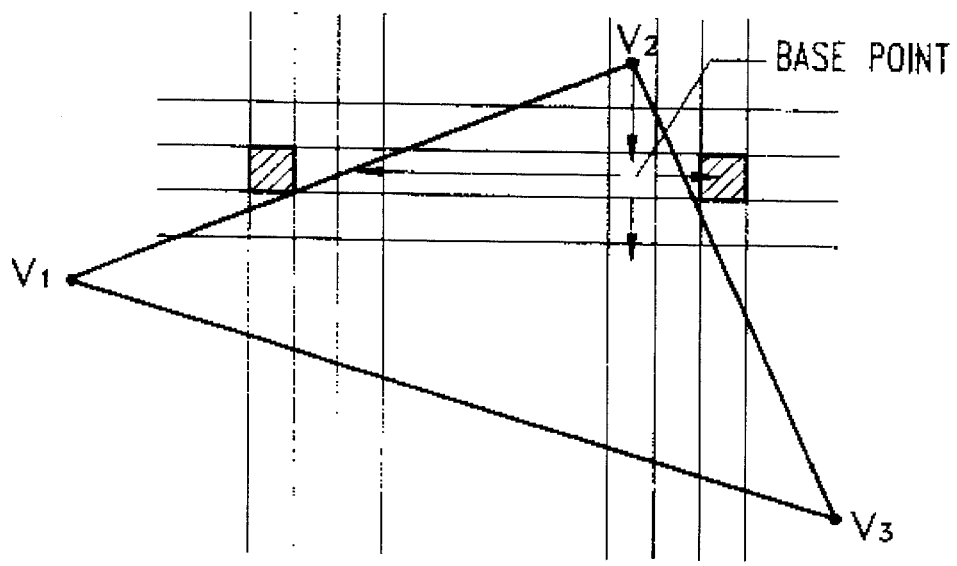
FIG. 1 is a conceptual diagram for illustrating triangle traversal performed by a conventional Pineda method.
FIG. 2 is a schematic diagram showing a 4×4 subpixel mask.
Figure 3C:
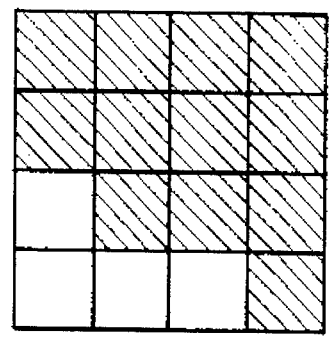
FIGS. 3A, 3B and 3C are schematic diagrams for illustrating the concept of the conventional subpixel mask generator using a look-up table.
Figure 3B:
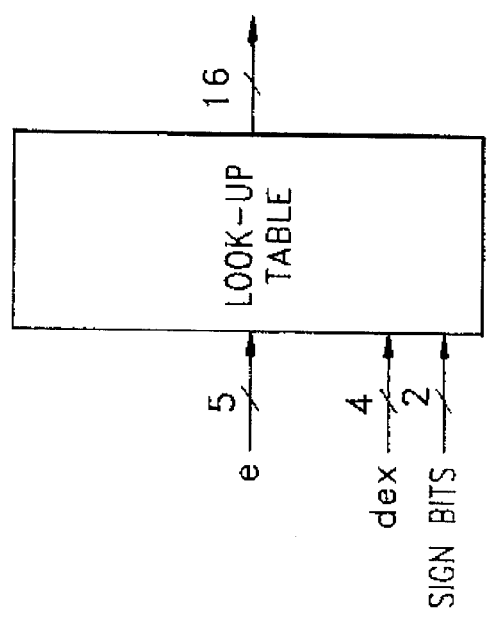
Figure 3A:
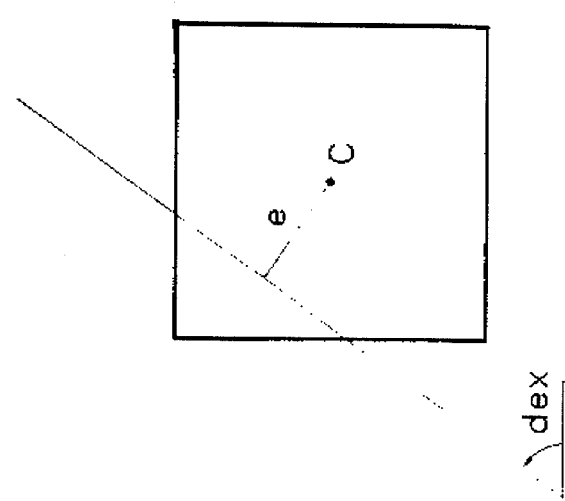
Figure 4A:
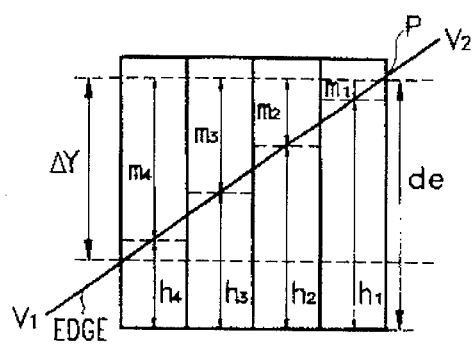
FIGS. 4A and 4B are schematic diagrams showing the formation of subblocks according to the present invention.
Figure 4B:
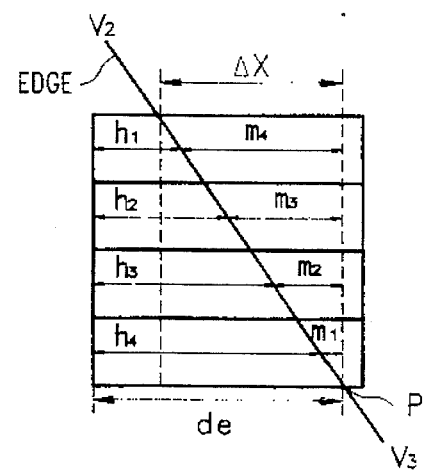
Figure 5A:
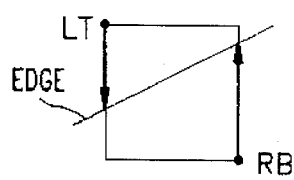
FIGS. 5A–5D are conceptual diagrams showing example sets of reference pairs and de pairs depending on the edge slope, according to the present invention.
Figure 5B:
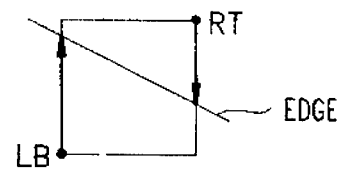
Figure 5C:
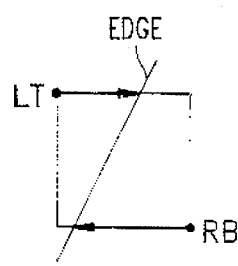
Figure 5D:
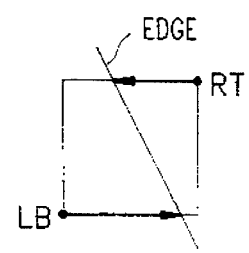

FIGS. 4A and 4B are diagrams showing the formation of subblocks according to the present invention, where FIG. 4A illustrates column subblocks and FIG. 4B illustrates row subblocks. Here, if the absolute value of the slope of the edge moving across a pixel is less than or equal to one, the pixel is divided into n column subblocks. and if greater than one, the pixel is divided into n row subblocks.

According to the present invention, polygon data in triangle units is received and the triangle traversal of a modified Pineda method is adopted. One pixel is divided into n subblocks and then a a subpixel mask is generated by an algorithm in subblock units without a look-up table. That is to say, a pixel is divided into column subblocks or row subblocks depending on the absolute values of the slope of an input triangle edge. Then, the distance from the pixel boundary to the edge is calculated for each subblock and a a subpixel mask is generated according to each subblock using each calculated subblock distance information.

Here, the modified Pineda method adopted by the present invention, by which a pair of reference points (FIGS. 5A–5D) is selected depending on the sign of the edge slope, the "cross" distance from the selected reference points to the edge is calculated, and then the time for returning to the base point is determined depending on the sign of the calculated cross distance, is different from the conventional Pineda method by which the distance from the pixel center to the edge is obtained and if the distance is a negative value (i.e., has a negative sign), it is determined that the pixel lies outside the triangle and then scanning returns to the base point. In other words, if the signs of a pair of cross distances calculated from the pair of reference points are both positive, it is determined that the pixel lies inside the triangle. Also, if one sign of the pair is positive and the other is negative, it is determined that the pixel straddles the edge, and if both are negative, it is determined that the pixel lies outside the triangle and immediately returns to the base point. In this manner, by using the modified Pineda method adopted by the present invention, the square root and division operations which were required in computing initial values for a conventional edge evaluation can be eliminated, thereby simplifying hardware implemention.

Referring to FIG. 4A illustrating column subblocks formed according to the present invention, since the absolute vlaue of the slope of the edge V1–V2 is less than or equal to one, the pixel is uniformly divided into four column subblocks. At this time, areas to the right of the edge are defined as being inside the triangle, the point where the edge and the right boundary of the pixel meet is an intersection point P, the distance from the bottom boundary to the intersection point P is a cross distance de and the height dimension from each column subblock's bottom boundary to the edge is expressed as a subblock coverage value h. Also, a horizontal line is drawn through point P, and the distance from the point where the center point intersects the horizontal line to the edge is defined as a slope ratio m. Meanwhile, it is assumed that the size of each pixel is 1×1, and ΔY represents the edge variation in the Y axis when pixel scanning is incremented by one in the direction of the X axis. Thus, the Y-axis variation is the slope of the edge. In FIG. 4A, $h_k$ denotes the coverage of a subblock k for the column subblocks, and $m_k$ denotes the slope ratio value of the column subblocks (where k is an integer).

Accordingly, the $h_k$ value, which is the subblock coverage (h) of the column subblock k, can be expressed: $h_k = de - m_k$. Here, the $m_k$ value is a slope ratio (m) of the k's column subblock, and the cross distance de is obtained by an interpolation method according to triangle traversal.

Therefore, in the case of an n×n subpixel mask, the following can be obtained.

$$m_k = \frac{\Delta Y(2k-1)}{2n} \qquad \text{Eq. (1)}$$

There is a division operation for computing subblock coverage in the above formulas. However, since n in the denominator term is the multiplier of 2, 2n is also the multiplier of 2. Therefore, the subblock coverage can be obtained by only a shift operation.

In FIG. 4B illustrating row subblocks formed according to the present invention, since the absolute value of the slope of the edge V1–V2 is greater than one, the pixel is uniformly divided into four row subblocks. At this time, the left side of the edge is inside the triangle, the point where the edge and the pixel bottom boundary meet is an intersection point P, the distance from the left boundary to the intersection point P is a cross distance de and the height dimension from a left pixel boundary (where the column center point of each row subblock passes) to the edge is a subblock coverage h. Also, a vertical line is drawn through point P, and the distance from the point where the row center intersects the vertical line to the edge is defined as a slope ratio value m. Meanwhile, assuming that the size of each pixel is 1×1, ΔX represents the edge variation in the X axis when pixel scanning is incremented by one in the Y axis direction. In FIG. 4B, $h_k$ denotes the k's subblock coverage of the row subblocks, and $m_k$ denotes the slope ratio value of a row subblock (where k is an integer).

At this time, applying the above formula $h_k = de - m_k$, if the absolute value of the slope is greater than one, the following formula can be derived.

$$m_k = \frac{\Delta X(2k-1)}{2n} \qquad \text{Eq. (2)}$$

FIGS. 5A to 5D each illustrate an example of a pair of reference points and a pair of cross distances (de), set depending on the edge slope, according to the present invention. Here, the pixels shown in FIGS. 5A and 5C each have a left top vertex LT and a right bottom vertex RB as a pair of reference points. The distances from vertices LT and RB to where the edge meets the boundary of the pixel are the cross distances de, as marked with arrows, for positive edge slopes which are less than one and greater than one, respectively. Conversely, the pixels shown in FIGS. 5B and 5D each have a left bottom vertex LB and a right top vertex RT as a pair of reference points. In this case, the distances from vertices LB and RT to where the edge meets the boundary of the pixel are the cross distances de, but for negative edge slopes which are less than one and greater than one, respectively.

Figure 6:
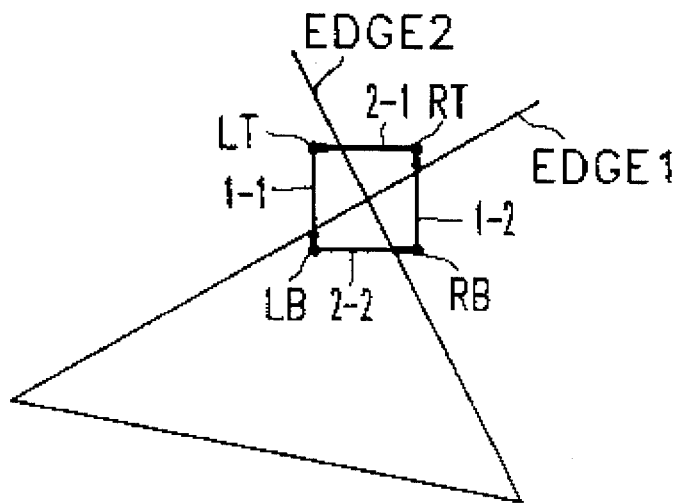
FIG. 6 is a conceptual diagram showing an example of setting the initial value of a pair of cross distances (de) according to the present invention.

FIG. 6 is a schematic diagram illustrating the example of setting initial value of a pair of cross distances according to the present invention. To compute the subblock coverage, the cross distance de which is the distance from the intersection point where the boundary of the pixel currently being processed and the edge meet to the reference of the pixel, is necessary in addition to the slope ratio value $m_k$. In FIG. 6, if a triangle data is input, the reference from which the cross distance with respect to each edge of the triangle is calculated, is set, first, and on the basis thereof, the initial value of the cross distance is calculated. In other words, only if the initial value of a certain pixel is input, since the cross distance for the other pixels of the edge can be obtained by the interpolation method without a separate input, the initial value of the cross distance is obtained in the early stage when the triangle data is input. Since the sign of the slope of edge 1 is positive, the left top vertex LT and the right bottom RB of the pixel are set as references in order to determine whether the pixel is inside or outside the polygon. Since the absolute value of the slope is less than one, the vertical cross distance (1-1, 1-2) from the reference to the edge is obtained and is set as a pair of initial values. Since the sign of the slope of edge 2 is negative, the left bottom vertex LB and the right top RT of the pixel are set as references in order to determine whether the pixel is inside or outside the polygon. Since the absolute value of the slope is greater than one, the horizontal cross distance (2-1, 2-2) from the reference to the edge is obtained and is set as a pair of initial values. In this manner, if the initial value of a pair of the cross distances with respect to each edge is obtained, while the pixel is moved one by one by the triangle traversal method, the cross distance de for a new pixel will be calculated. Here, one pair of cross distances to be newly calculated is calculated by interpolation method that the value of the cross distance de of the previous pixel is added to a given adding value which is precalculated.

The base axis for calculating the value of the cross distance de, adding value, reference pair, which depends on the edge slope are summarized in the following Table 1.

TABLE 1

| sign of slope | absolute value of slope | axis | adding value | reference point |
|---|---|---|---|---|
| positive | >1 | X | X-axis variation 1 | left top & right bottom of pixel |
|  |  |  | Y-axis variation ΔX |  |
|  | ≦1 | Y | X-axis variation ΔY |  |
|  |  |  | Y-axis variation 1 |  |
| negative | >1 | X | X-axis variation 1 | left bottom & right top of pixel |
|  |  |  | Y-axis variation ΔX |  |
|  | ≦1 | Y | X-axis variation ΔY |  |
|  |  |  | Y-axis variation 1 |  |

Since the cross distances de calculated on the basis of the above Table 1 are two per edge, only one value of the cross distances de should be selected to calculate the subblock coverage. First, among a pair of cross distances, the cross distance de being less than or equal to one is selected and if both values of the cross distances de are less than or equal to one, the positive cross distance is selected for calculating the subblock coverage.

Figure 7:
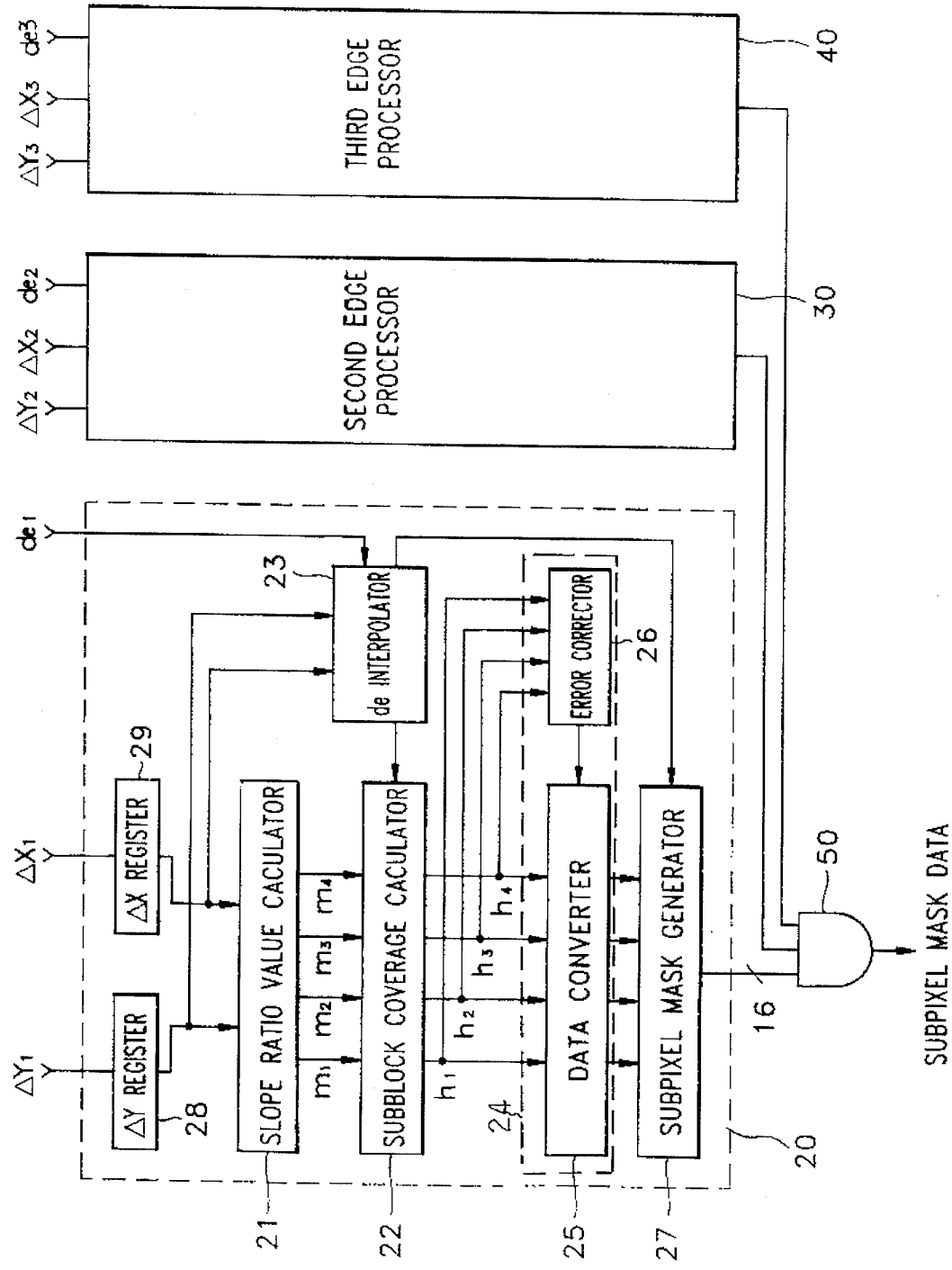
FIG. 7 is a block diagram of the polygon-edge subpixel mask generator according to the present invention.

FIG. 7 is a block diagram of the subpixel mask generator of polygon edge according to the present invention. The subpixel mask generator includes a first edge processor 20, a second edge processor 30, a third edge processor 40 and an AND gate 50, and generates a subpixel mask for removing aliasing generated in a triangle edge. Also, the edge processors 20, 30 and 40 respectively include a slope ratio value calculator 21, a subblock coverage calculator 22, a cross distance (de) interpolator 23, a data converting unit 24 comprising a data converter 25 and an error corrector 26, and a subpixel mask generator 27, which together generate a subpixel mask for removing aliasing generated at the edges forming a polygon.

In FIG. 7, the first edge processor 20 receives the $\Delta X1$ and $\Delta Y1$ values and the cross distance initial value $de_1$ of the first edge and then generates an n×n subpixel mask of a pixel moving over the first edge. The second edge processor 30 receives the $\Delta X2$ and $\Delta Y2$ values and the cross distance initial value $de_2$ of the second edge and then generates an n×n subpixel mask of the pixel moving over the second edge. The third edge processor 40 receives the $\Delta X3$ and $\Delta Y3$ values and the cross distance initial value $de_3$ of the third edge and then generates an n×n subpixel mask of the pixel moving over the third edge. The AND gate 50 receives the outputs of the first, second and third edge processors 20, 30 and 40, performs an AND operation with respect thereto and thus generates a subpixel mask for removing the aliasing generated at the triangle edges. In FIG. 7, the slope ratio value calculator 21 receives the $\Delta Y$ and $\Delta X$ values through $\Delta Y$ and $\Delta X$ input registers 28 and 29, selects one depending on the edge slope, calculates slope ratio value $m_k$ for each subblock and outputs the same. In other words, the slope ratio value calculator 21 selects $\Delta Y$ as the variation value input thereto if the edge slope is positive and selects $\Delta X$ if it is negative. Also, the slope ratio value calculator 21 can be implemented by a plurality of shift registers for receiving the selected variation (delta) value and shifting by a predetermined number of bits and a plurality of adders for summing the outputs of the shift registers.

The cross distance interpolator 23 receives the cross distance initial value $de_1$, calculates the value of the cross distance de for computing subblock coverage and outputs the calculated value to the subblock coverage calculator 22. Also, the cross distance interpolator 23 calculates new cross distance pairs from a pair of the previous pixel by an interpolation method, and among a pair of cross distances, selects one to be used in computing subblock coverage and outputs the same.

The subblock coverage calculator 22 receives the outputs of the slope ratio value calculator 21 and the output of the cross distance interpolator 23, calculates the subblock coverage $h_k$ and then outputs the calculated subblock coverage $h_k$ to the data converter 25 and the error corrector 26. Also, the subblock coverage calculator 22 can be implemented by a plurality of subtracters for subtracting the output of the subblock coverage calculator 22 from the output of the cross distance interpolator 23.

The data converting unit 24 receives the output of the subblock coverage calculator 22, converts the received output into data for setting masks and then outputs the converted data to the subpixel mask generator 27. In other words, the data converting unit 24 includes an error corrector 26 for generating a corrected value by receiving and sorting the output of the subblock coverage calculator 22, and a data converter 25 for receiving the output of the subblock coverage calculator 22 and the output of the error corrector, and converting the received information into subpixel mask setting data.

The subpixel mask generator 27 receives the output of the data converter 25 and sets an n×n subpixel mask depending on the slopes and the cross distance interpolator output. That is to say, the subpixel mask generator 27 sets the mask depending on the data converted in column block units if the edge slope is less than or equal to one, and set the mask depending on the data converted in row block units if the edge slope is greater than one. The subpixel mask generator 27 can be implemented by n×n D flip-flops for outputting the set value to the Q ports thereof if the sign of the cross distance is positive, and outputting the set value to the /Q port if the sign of the cross distance is negative.

Figure 8:
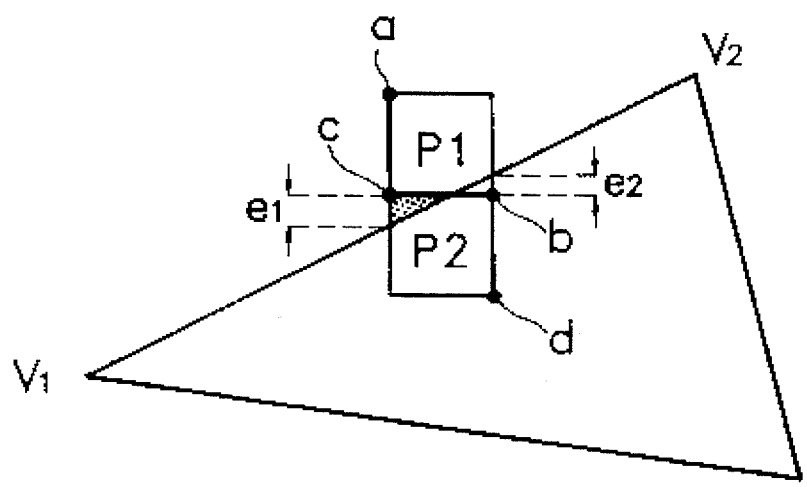
FIG. 8 is a conceptual diagram showing a processing example by determining whether a pixel lies inside or outside the triangle, according to the present invention.

FIG. 8 is a conceptual diagram showing a processing example by determining whether a pixel lies inside or outside the triangle, according to the present invention.

In setting subpixel mask, when the pixel straddles an edge, it is very important which part of the pixel lies inside the triangle. In FIG. 8, two pixels P1 and P2 intersect with respect to edge V1–V2, and the values of the cross distances de for each pixel are considered. Since the slope intersecting pixels P1 and P2 is less than or equal to one, the reference points are a pair of left top and right bottom vertices a & b and c & d. In the pixel P1, the distance (absolute value) from point "a" to the edge is greater than one, the value of the cross distance de of the pixel P1 is used in computing the subblock coverage by obtaining the distance e2 from point "b" to the edge. Therefore, the subblock coverage value of the pixel P1 with respect to the edge is directly calculated as falling inside the triangle. In the case of the pixel P2, since the distance from point "d" to the edge is greater than one, the distance e1 (from point "c" to the edge) is adopted as the cross distance de. In this case, since the dotted portion falls outside the triangle, the inverted value is selected to then be output when a subpixel mask is output. Therefore, whether the currently calculated subblock coverage is inside or outside the triangle is important information for generating proper subpixel mask.

Figure 9:
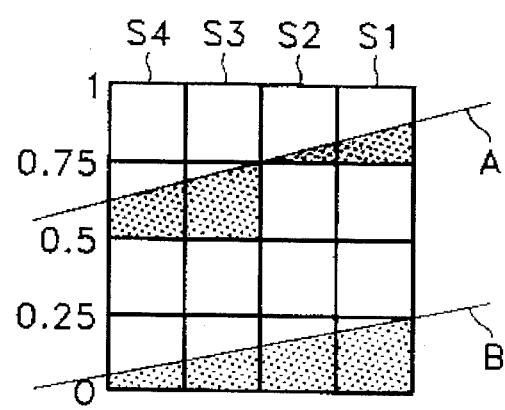
FIG. 9 is a conceptual diagram for explaining the necessity of correcting errors.

FIG. 9 is a conceptual diagram for explaining the necessity of correcting errors. Since the respective values of the subblock coverage in one pixel are decimal point values, the values should be converted into data usable in the setting of a subpixel mask. In order to generate an n×n subpixel mask, one pixel is divided into n subblocks and each subblock is again divided into n subpixels. Therefore, in order to set n subpixels for each subblock, the number of bits required is $\log_2 n+1$. Consequently, the ($\log_2 n+1$) upper bits, e.g., 3 bits in the case of a 4×4 subpixel mask, from the values calculated in the subblock coverage calculator 22 are determined as the bits required by the subpixel mask generator 27. Thus, although the number of bits required for setting masks is $\log_2 n+1$, if the upper bits only are adopted without any compensation, subpixel errors may be generated. In order to correct such errors, the accuracy for the calculation of the subblock coverage value should be decided. According to the embodiment of the present invention, in order to reduce the errors to be less than one subpixel, since each subblock should be calculated as an error limit of less than $1/n^2$, the accuracy should be $1/2n^2$ at the least. Therefore, in the case of a 4×4 subpixel mask, accuracy to the fifth decimal place should be maintained, and in the case of an 8×8 subpixel mask, accuracy to the seventh decimal place should be maintained. For an error correction, among the subblock coverage values calculated with a level of accuracy as above, the remainder values except the ($\log_2 n+1$) upper bits are added to then obtain an error compensation value. Thereafter, the error value is compensated in the step of setting subpixel mask.

In the case of 1×1 sized pixel as shown in FIG. 9, the size of each subpixel is 0.25×0.25 so that the subdivision of the pixel is expressed as 0, 0.25, 0.5, 0.75 and 1.

Edges A and B have equal slopes. However, the edge A is determined to be set as 10 subpixels, and the edge B has only the subpixels whose errors should be corrected. As the shaded portions total about two subpixels in each case, two subpixels are to be corrected for each of the edges A and B. In correcting the edge A, since the vertical dimension of the shaded subpixel areas (to be corrected) decreases in the sequence of subblocks S3, S4, S1 and then S2, priority should be given to the subpixels of the third and fourth subblocks S3 and S4. Meanwhile, for the correction of the edge B, the vertical dimension of the shaded subpixel areas decreases in the sequence of S1, S2, S3 and then S4, so that priority is given to the subpixels of the first and second subblocks S1 and S2. In such a manner, the determination of the priority for the subpixels to be corrected is made by comparing the remainder values except the $\log_2 n+1$ upper bits with one another and sorting them. Then, the subpixels to be corrected are set starting at the subpixel with the maximum value, thereby enabling to obtain subpixel mask approximate to the pixel coverage shape generated by the polygon edge crossing the pixel.

Figure 10A:
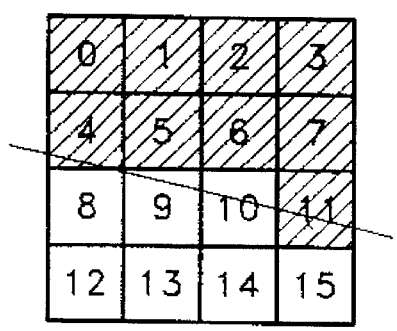
FIGS. 10A and 10B show a subpixel mask example generated by inversing the calculated outside coverage of a triangle.
Figure 10B:
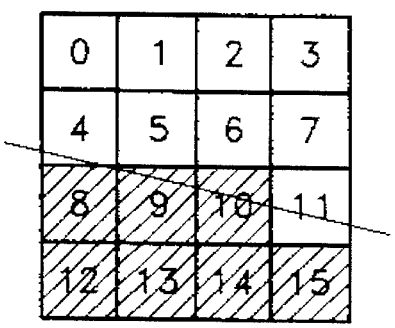

FIGS. 10A and 10B show an example of a subpixel mask generated by inversing the calculated outside coverage of a triangle. Here, if the subpixel mask shown in FIG. 10A is inversed, the subpixel mask shown in FIG. 10B is generated. In other words, as described with respect to FIG. 8, if the subpixel mask is obtained by calculating the subblock coverage outside the triangle, the inversed value of the calculated subblock coverage is finally output and then converted (inversed) into a subpixel mask inside the triangle.

Figure 11:
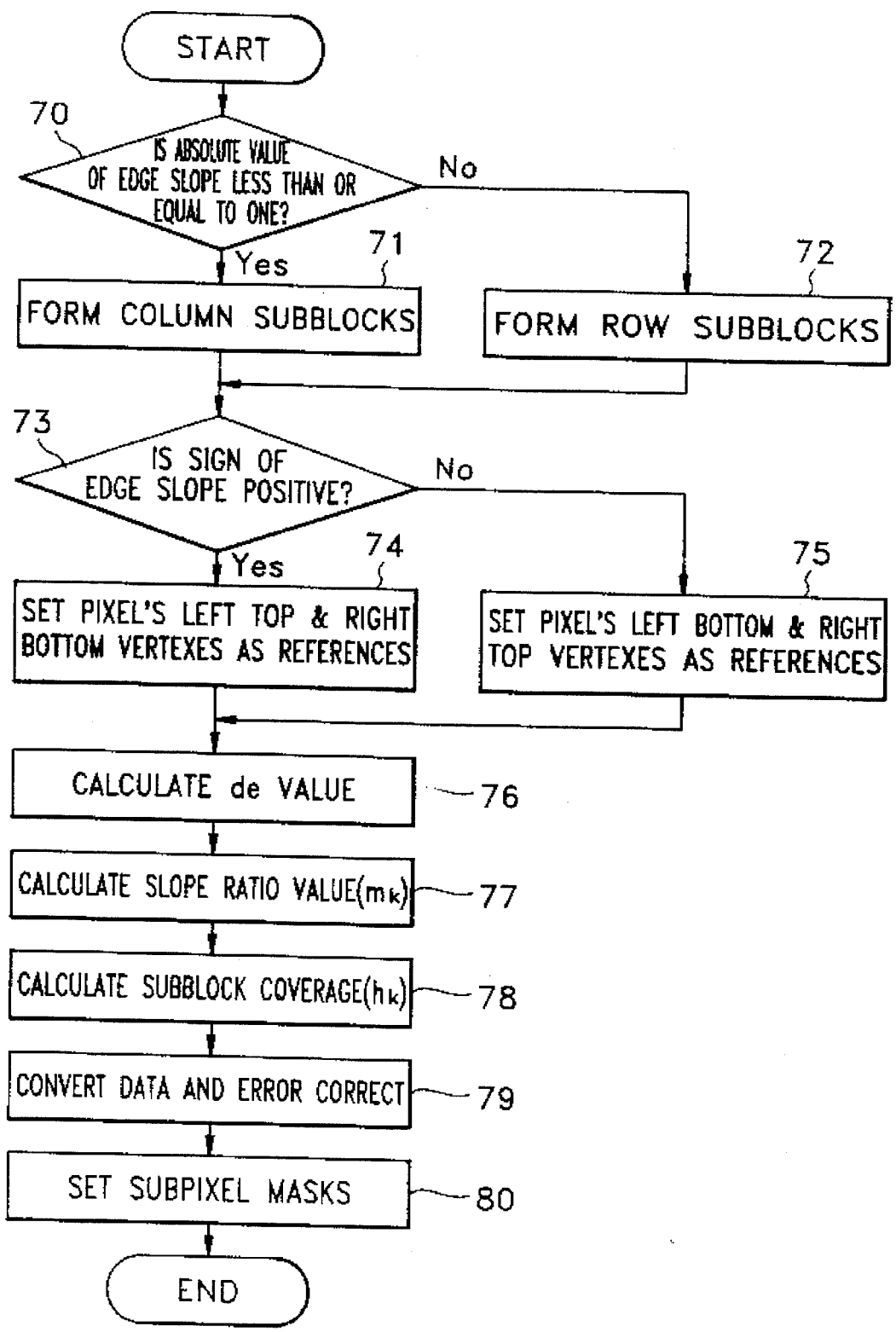
FIG. 11 is a flowchart of the subpixel mask generating method for the anti-aliasing of a polygon edge according to the present invention.

FIG. 11 is a flowchart of the subpixel mask generating method for the anti-aliasing of a polygon edge, according to the present invention.

The method for generating an n×n subpixel mask of the pixel passing over the edge having a predetermined slope by receiving $\Delta X$ and $\Delta Y$ values and a cross distance initial value, includes the steps of forming subblocks by dividing a pixel into n subblocks depending on the slope (steps 70–72), calculating subblock coverage by obtaining the distance from the pixel boundary to the point where the n subblocks and polygon edge meet (steps 73–78), and generating an n×n subblock mask depending on the calculated subblock coverage (steps 79 and 80).

In the formation of subblocks, step 70 determines whether the slope of the polygon edge is less than or equal to one, and if so, n column subblocks are formed in step 71. If step 70 determines that the slope is not less than or equal to one, n row subblocks are formed (step 72).

In the calculation of subblock coverage, a pair of reference points is determined depending on edge slopes, in steps 73, 74 and 75. Here, if the edge slope is positive (step 73), left top and right bottom vertices are determined as the reference points (step 74), and if negative, left bottom and right top vertices are determined as the reference points (step 75). Then, in step 76, a cross distance de (defined by the distance from either reference point to the intersection of the polygon edge and the pixel boundary) is calculated. Here, a pair of de values are compared and, first, the value less than or equal to one is selected for use in the computation, but if both are less than or equal to one, the positive value is selected. Next, in step 77, the slope ratio value $m_k$ (defined as the distance from a horizontal line drawn through the intersection point in parallel to another pixel boundary, to the edge) is calculated in subblock units, and using the values (de and $m_k$) obtained in the previous steps, in step 78, the subblock coverage is calculated according to the formula $h_k = de - m_k$.

Here, in the case of the column subblocks, the $\Delta Y$ values are multiplied sequentially, thereby obtaining the slope ratio value using the above Equation (1). For row subblocks, $\Delta X$ values are multiplied sequentially, thereby obtaining the slope ratio value using the above Equation (2).

In the generation of subblock masks, step 79 is for obtaining an error correction value by receiving the calculated subblock coverage and then converting the subblock coverage and the error correction value into data for setting subpixels, and step 80 is for setting subpixel mask depending on the slope magnitude, the converted data and the sign of the de value. In step 79, the subblock coverage and the error correction value are converted data values composed of $\log_2 n+1$ bits, and in step 80, the subpixel mask is set depending on the converted data (in column subblock units) if the slope is less than one. If the slope is greater than one, the subpixel mask is set depending on the data converted in row subblock units. Also, in the mask setting step, if the de value is positive, the mask is set depending on the converted data and then output without inversion, and if negative, the value set depending on the converted data is inversed to then be output.

As described above, the present invention adopts the modified Pineda method to a triangle traversal, which enables to make hardware implementation easy by removing square root and division operations from the computing of the initial value for edge evaluation, and simplifies the hardware itself by generating a subpixel mask directly by operation without using a look-up table, thereby enabling a graphics algorithm to be easily made into an application-specific intergrated circuit (ASIC). Also, since the memory for a look-up table is not necessary, the pixel can be easily divided into many more subpixels, thereby improving the image quality.

What is claimed is:

1. A method for generating an n×n subpixel mask of a pixel for antialiasing by receiving $\Delta X$ and $\Delta Y$ values of an edge having a slope and an initial value of a cross distance, the method comprising the steps of:

forming subblocks by dividing the pixel into n subblocks depending on the slope;

calculating a subblock coverage by:
determining a pair of reference points depending on the slope of the edge,
calculating cross distances (de) defined by the distance from one of the reference points to an intersection point of the edge and a pixel boundary,
subtracting a slope ratio value from a first cross distance after calculating a corresponding cross distance from the initial value of the first cross distance by an interpolation method and calculating slope ratio values of the formed subblocks, including calculating a slope ratio value ($m_k$), by drawing a first line parallel to another pixel boundary line at the intersection point and then obtaining a distance from the first line to the edge, in the subblock units, and calculating the subblock coverage ($h_k$) as $h_k=de-m_k$; and generating an n×n subpixel mask depending on the calculated subblock coverage, whereby aliasing generated at the edge is removed.

2. The method for generating a subpixel mask for antialiasing as claimed in claim 1, wherein the subblock forming step includes the steps of:

forming n column subblocks if an absolute value of the slope of the edge is no larger than one; and forming n row subblocks if the absolute value of the slope of the edge is greater than one.

3. The method for generating a subpixel mask for antialiasing as claimed in claim 1 wherein the reference point determining step includes utilizing top left and bottom right vertices of the pixel as the reference points if the slope of the edge is positive and utilizing bottom left and top right vertices of the pixel as the reference points if the slope of the edge is negative.

4. The method for generating a subpixel mask for antialiasing as claimed in claim 1 wherein the cross distance calculating includes comparing a value of the first cross distance with a value of a corresponding cross distance and selecting the value of the cross distance having an absolute value no larger than one as the cross distance value to be used in calculating the subblock coverage, and selecting the value of the cross distance that is positive if the absolute values of the cross distances are both no larger than one.

5. The method for generating a subpixel mask for antialiasing as claimed in claim 1 wherein calculating the slope ratio value includes sequentially obtaining $\Delta Y$ values in the order of said column subblocks (k) using the formula $$m_k = \frac{\Delta Y(2k-1)}{2n}$$

with respect to column subblocks, and sequentially obtaining $\Delta X$ values in the order of said row subblocks (k) using the formula $$m_k = \frac{\Delta X(2k-1)}{2n}$$

with respect to row subblocks.

6. The method for generating a subpixel mask for antialiasing as claimed in claim 1, wherein said n×n subpixel mask generating step includes the steps of:

obtaining an error correction value by adding and sorting the subblock coverage;

converting the subblock coverage and error correction value into data for setting a subpixel mask; and setting a subpixel mask depending on a magnitude of the slope, the data, and sign of the first cross distance.

7. The method for generating a subpixel mask for antialiasing as claimed in claim 6, wherein converting is performed such that the subblock coverage and the error correction value are converted into data composed of $\log_2 n+1$ bits.

8. The method for generating a subpixel mask for antialiasing as claimed in claim 6, wherein subpixel mask setting step includes setting the subpixel mask in column subblock units depending on said converted data if an absolute value of the slope is less than or equal to one, and setting the subpixel mask in row subblock units depending on said converted data if the absolute value of the slope is greater than one.

9. The method for generating a subpixel mask for antialiasing as claimed in claim 6, wherein subpixel mask setting includes setting the subpixel mask to a first value depending on the data and then outputting the first value if the sign of the first cross distance is positive, and setting the subpixel mask to an inverse of the first value if the sign of the first cross distance is negative.

10. An apparatus for generating an n×n subpixel mask of a pixel for antialiasing in a computer graphics system by receiving $\Delta X$ and $\Delta Y$ values of an edge having a slope and an initial value of a cross distance, the apparatus comprising:

a slope ratio value calculator for calculating a slope ratio value by selecting the $\Delta X$ or the $\Delta Y$ value depending on the slope;

a cross distance interpolator for calculating the cross distance necessary for computing subblock coverage using an interpolation method, receiving the initial value of the cross distance, and selecting the initial value for use in computing the subblock coverage;

a subblock coverage calculator for calculating the subblock coverage, receiving the slope ratio value output from said slope ratio value calculator and the cross distance output from said cross distance interpolator, wherein said subblock coverage calculator includes a plurality of subtractors for subtracting an output of said subblock coverage calculator from an output of said cross distance interpolator;

data converting means receiving the subblock coverage output from said subblock coverage calculator for converting the subblock coverage into data for setting a subpixel mask; and a subpixel mask generator, receiving the data from said data converting means, for generating an n×n subpixel mask depending on the slope and the cross distance output from said cross distance interpolator, whereby aliasing generated at the edge is removed.

11. The apparatus for generating a subpixel mask for antialiasing as claimed in claim 10, wherein the $\Delta Y$ value is selected as the input to said slope ratio value calculator if the slope is positive and the $\Delta X$ value is selected as the input to said slope ratio value calculator if the slope is negative.

12. The apparatus for generating a subpixel mask for antialiasing as claimed in claim 10, wherein said slope ratio value calculator includes:

a plurality of shift registers for shifting by a predetermined number of bits, receiving the selected $\Delta X$ or $\Delta Y$ value; and a plurality of adders for summing outputs of said plurality of shift registers.

13. The apparatus for generating a subpixel mask for antialiasing as claimed in claim 10, wherein said data converting means includes:

an error corrector for generating an error correction value by adding and sorting outputs of said subblock coverage calculator; and a data converter for converting outputs of said subblock coverage calculator and said error corrector into the data for setting the subpixel mask.

14. The apparatus for generating a subpixel mask for antialiasing as claimed in claim 10, wherein said subpixel mask generator includes n×n D flip-flops for setting output values depending on the data in column subblock units if the absolute value of the slope is less no larger than one and setting the output values depending on the data in row subblock units if the absolute value of the slope is greater than one, and for outputting the output values to non-inverted output ports when the sign of the cross distance is positive and for outputting the output values to inverted output ports when the sign of the cross distance is negative.

15. An apparatus for generating a subpixel mask of a computer graphics system wherein aliasing generated at triangle edges is removed, said apparatus comprising:

a first edge processor for generating an n×n subpixel mask for a pixel passing over a first edge by receiving the ΔX1 and ΔY1 values of the first edge and an initial value of a cross distance;

a second edge processor for generating an n×n subpixel mask for a pixel passing over a second edge by receiving ΔX2 and ΔY2 values of the second edge and the initial value of the cross distance;

a third edge processor for generating an n×n subpixel mask for a pixel passing over a third edge by receiving ΔX3 and ΔY3 values of the third edge and the initial value of the cross distance; and an AND gate for performing an AND operation, receiving the outputs of said first, second, and third edge processors.

16. A method for generating an n×n subpixel mask of a pixel for antialiasing by receiving ΔX and ΔY values of an edge having a slope and an initial value of a cross distance, the method comprising:

forming subblocks by dividing the pixel into n subblocks depending on the slope;

calculating subblock coverage by subtracting a slope ratio value from a first cross distance after calculating a corresponding cross distance from the initial value of the first cross distance by an interpolation method and calculating slope ratio values of the formed subblocks;

generating an n×n subpixel mask depending on the calculated subblock coverage, whereby aliasing generated at the edge is removed;

obtaining an error correction value by adding and sorting the subblock coverage;

converting the subblock coverage and error correction value into data for setting a subpixel mask; and setting a subpixel mask depending on the magnitude of the slope, the data, and sign of the first cross distance.

* * * * *